THOMAS A. CONNOLLY
DAVID B. KAPLAN
ALFRED D. SCARBROUGH
INVENTORS

BY Arthur Frailich
ATTORNEY

Feb. 14, 1967 T. A. CONNOLLY ET AL 3,304,415

COUNTER APPARATUS

Filed Sept. 10, 1963 3 Sheets-Sheet 2

THOMAS A. CONNOLLY
DAVID B. KAPLAN
ALFRED D. SCARBROUGH
INVENTORS

BY Arthur Freilich

ATTORNEY

COUNTER APPARATUS

INVENTORS
THOMAS A. CONNOLLY
DAVID B. KAPLAN
ALFRED D. SCARBROUGH
BY Arthur Freilich
ATTORNEY

United States Patent Office 3,304,415

Patented Feb. 14, 1967

3,304,415

COUNTER APPARATUS

Thomas A. Connolly, Anaheim, and David B. Kaplan and Alfred D. Scarbrough, Los Angeles, Calif., assignors, by mesne assignments, to The Bunker-Ramo Corporation, Stamford, Conn., a corporation of Delaware Filed Sept. 10, 1963, Ser. No. 307,962
11 Claims. (Cl. 235—92)

This invention relates generally to counter apparatus and more particularly to high speed digital counter apparatus adapted to count the number of electrical signals, of predetermined characteristics, applied thereto.

Although the prior art is replete with innumerable counter devices, much effort is still expended in the development of new types of counter apparatus to satisfy needs arising as a result of new problems encountered in extending the state of such arts as digital data communication and navigation.

For example, it is sometimes desirable to utilize on board a vehicle a digital computer apparatus, operating in conjunction with a radio receiver adapted to receive digital data signals transmitted by a movable remote station, for enabling the position of the vehicle to be determined. The data transmitted by the remote station during each of periodically recurring intervals, can consist of a time mark followed by sufficient digital data to permit the computer to caluculate the position of the vehicle at the time mark identifying the start of the interval. By identifying the position of the station at the start of at least two different intervals, and by using a doppler technique to measure changes in vehicle-station separation as the station moves from its position at one time mark to its position at a subsequent time mark, the position of the vehicle can be determined.

In a system of this type, it appears to be very essential to keep an accurate account of time so as to be able to precisely know when a time mark occurs. Typical requirements, for example, might dictate that a clock capable of providing a 24 hour time reference accurate to one microsecond be provided. Digital clocks consisting of counters driven by extremely stable and accurate frequency generators are capable of operating to this accuracy. Such digital clocks of conventional design would include a microseconds counter section, a seconds counter section, a minutes counter section, and an hours counter section. The microseconds counter section of course must be capable of counting from zero to 999,999 in response to signals generated every microsecond by a one megacycle frequency generator. The seconds section must be capable of counting from zero to 59 in response to cycles of the microseconds counter section. Similarly, the minutes counter section must be capable of counting from zero to 59 in response to cycles of the seconds counter section and the hours counter section must be capable of counting from zero to 23 in response to cycles of the minutes counter section.

A conventionally constructed binary counter capable of counting to 999,999 would include twenty binary stages, all driven by a one mc. frequency generator. The stages would be interconnected such that the output pulse rate of the first stage or least significant stage would be 500 kc., and the output pulse rate of each succeeding stage would be one-half the output pulse rate of the stage immediately preceding it (except for the twentieth stage whose output pulse rate would be one per second). As a consequence of driving this many stages from a single frequency generator, or several generators operating at the same frequency, considerable power at the frequency must be provided. Since a portion of this power is necessarily radiated, it will tend to interfere with equipment in the proximity thereof which is sensitive to one mc. noise. Although several different techniques can be advantageously utilized to reduce the amount of power radiated, it would be more desirable to be able to reduce power requirements at that frequency.

In view of the above, it is an object of this invention to provide a counter apparatus consisting of $n$ stages divided into at least first and second portions, the stages of the first and second portions being respectively driven by first and second frequency generators operating asynchronously.

More particularly, a first counter portion, which will henceforth be called the microcounter will be connected to a second counter portion, which will henceforth be called the macrocounter so that the macrocounter functions to count cycles of the microcounter. If a total of $n$ counter stages are required (20 stages are required to count to 999,999), and if the microcounter includes X stages, then it follows that the macrocounter includes $n$-X stages. The stages of the microcounter can be driven by a first frequency generator and the stages of the macrocounter can be driven by a second frequency generator operating asynchronously with respect to the first frequency generator.

As a consequence of separating a counter apparatus into two asynchronously operating portions, the power requirements of the first generator can be considerably reduced thereby reduced objectionable power radiation at its frequency.

By operating two portions of the counter apparatus asynchronously however, considerable problems are encountered in attempting to implement means for either reading the counter apparatus in response to a time mark or calibrating the counter apparatus to compensate for any drift in the frequency generators. More particularly, the microcounter and macrocounter portions cannot be read simultaneously because the macrocounter is not always updated at the same relative point in the microcounter cycle. In other words, when a time mark occurs at the same relative point in two different cycles of the microcounter, the possibility exists that for one of those cycles, the macrocounter has already been updated and for the other of those cycles, the macrocounter has not as yet been updated.

Accordingly, it is an object of this invention to provide means for enabling a count to be accurately read from or stored in a counter apparatus including at least two asynchronously operating portions.

Briefly, the invention herein is based on the recognition that the stages of a digital counter apparatus need not all be operated synchronously if they are arranged in at least first and second portions interconnected by a buffer stage such that although the stages of the first portion are switched at times determined by manifestations occurring at a first frequency, indications of each cycle of the first portion are recorded in and read from the buffer stage to drive the stages of said second portion at times determined by manifestations occurring at a second frequency and that a counter apparatus so arranged can indicate a count of occurred first frequency manifestations to an accuracy of one such manifestation.

In a preferred embodiment of the invention, three flip-flop stages, comprising the microcounter, are connected through a buffer flip-flop to a seventeen flip-flop stage macrocounter. The microcounter counts pulses generated by a one mc frequency generator and for each cycle of the microcounter, the buffer flip-flop is caused to switch from a false to a true and back to a false state at times determined by pulses generated by a 333 kc. frequency generator. The macrocounter counts the cycles of the buffer flip-flop.

When a time mark ocurs, the microcounter can be read in response to the next one mc pulse generated. The macrocounter cannot be immediately read however because the macrocounter may or may not have been updated to correspond with the microcount cycle. More particularly, the macrocounter is updated between three and seven microseconds after the microcount cycle is initiated. Since the microcounter includes three flip-flops, it should be apparent that the microcount cycle time is 8 microseconds.

Since it is not known whether the macrocounter has been updated when a time mark occurs, and since the macrocounter cannot therefore be immediately read, it is necessary to wait until some later time at which it is known that the macrocounter has been updated. For convenience sake, this later time has been chosen to be some time subsequent to the updating of the macrocounter during the microcount cycle subsequent to the cycle in which the time mark occurred. Consequently, by always reading the microcounter in response to the one mc pulse immediately following the occurrence of the time mark and by reading the macrocounter subsequent to its updating during the next microcount cycle, an accurate count will always be obtained regardless of where the time mark occurred in the microcount cycle.

This same technique, that is of treating the macrocounter at some time subsequent to the corresponding treatment of the micro counter, is utilized in order to reset the macrocounter after it has counted to a total of 999,999. Similarly, this technique is utilized in order to calibrate the counter, that is in order to add to or subtract from the represented count by replacing the count with a known more accurate count.

Although the preferred embodiment disclosed herein is concerned with a counter adapted to count to one million, i.e. from zero to 999,999, in which two portions are respectively driven by frequency generators respectively providing one mc. ($f_1$) and 333 kc. ($f_2$) signals, it is pointed out that these particular frequencies are not critical and the teachings of the invention can be easily extended to counters of any frequency.

The novel features that are considered characteristic of this invention are set forth with particularity in the appended claims. The invention both as to its organization and method of operation, as well as additional objects and advantages thereof, will best be understood from the following description when read in connection with the accompanying drawings, in which:

Figures 1, 2:
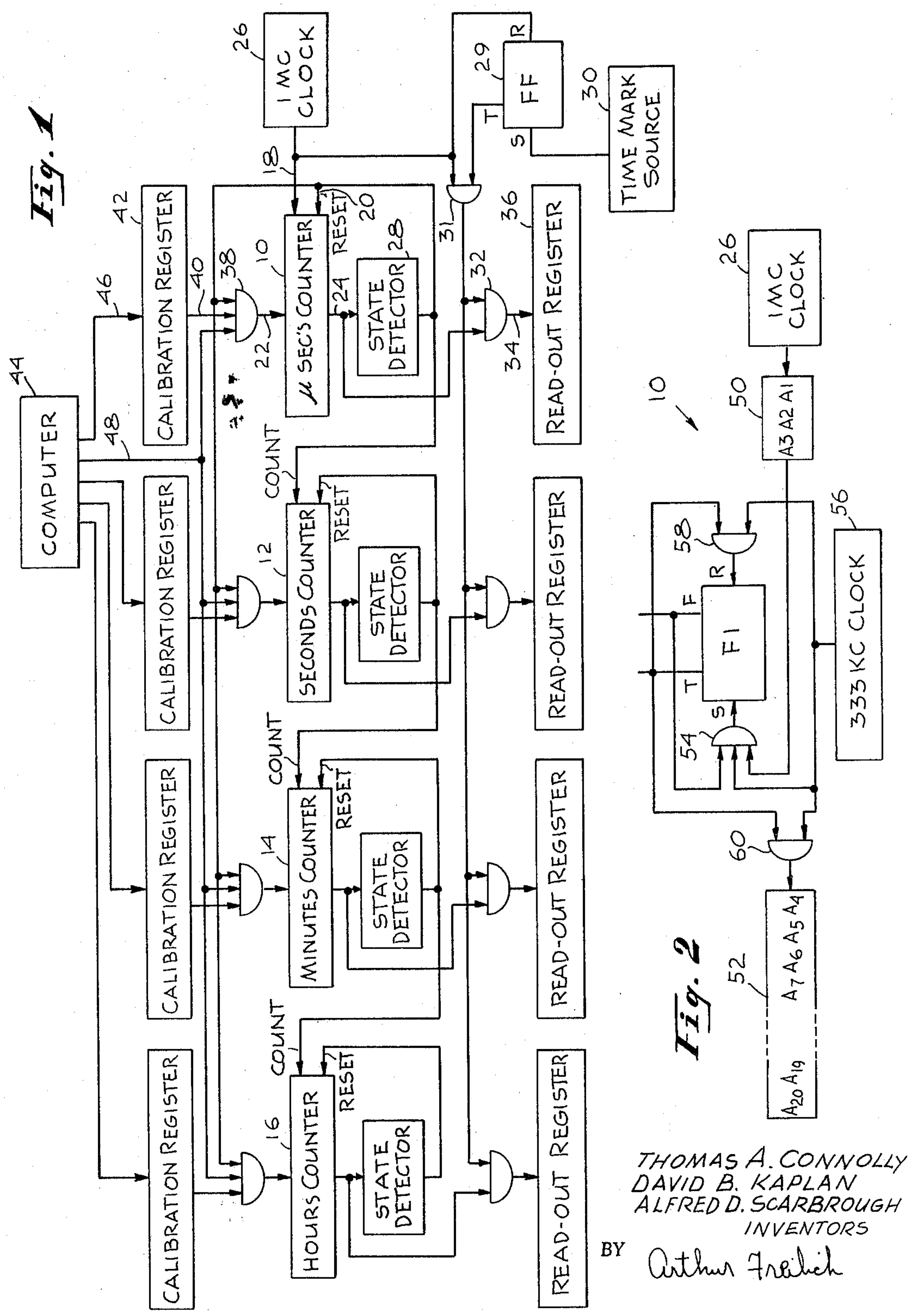
FIGURE 1 is a block diagram of a digital clock apparatus in which the present invention is adapted to be utilized.
FIGURE 2 is a simplified block diagram of a counter constructed in accordance with the present invention and illustrating two counter portions coupled by a buffer flip-flop.

Attention is now called to FIG. 1 of the drawings which illustrates one type of digital clock in which the teachings of this invention are adapted to be utilized. The illustrated digital clock is adapted to keep a running count of time to an accuracy of one microsecond over a 24 hour period. For this purpose, it includes a microseconds counter 10, a seconds counter 12, a minutes counter 14, and an hours counter 16. Each of the counters is provided with a count input terminal and a reset input terminal. (It is pointed out that where the word "terminal" is used herein with reference to a multistage element such as a counter or register, it should be understood as actually referring to a set of terminals including one terminal per stage). Pulses applied to the count input terminal cause the count stored in the counter to incrementally increase while pulses applied to the reset input terminal reset the count in the counter to zero. Additionally, each of the counters is provided with a data input terminal 22 and a data output terminal 24. By applying appropriate signals to the data input terminal 22, a desired arbitrary number can be entered into the counter in place of the count therein. The data output terminal 24 can be utilized to read or transfer the count stored in the counter to some storage means.

A one mc frequency generator or clock source 26 is connected to the count input terminal 18 of the microseconds counter 10. The microseconds counter 10 has a sufficient number of binary stages to enable it to count from zero to 999,999 (i.e. 20 stages). A state detector 28 is connected to the data output terminal 24 and has the capability of sensing a count of 999,999. The output of the state detector 28 is connected to the count input terminal 18 of the seconds counter 12 and to the reset input terminal 20 of the microseconds counter 10. Functionally, the state detector 28 serves to increment the seconds counter for each cycle of the microseconds counter and serves to reset the microseconds counter to zero after it has reached its maximum desired count (i.e. 999,999). State detectors are associated with the seconds counter 12, the minutes counter 14, and the hours counter 16 in a similar manner such that the minutes counter 14 counts cycles of the seconds counter 12, and the hours counter 16 counts cycles of the minutes counter 14.

The output terminal of a source of time marks 30 is connected to the set input terminal of a time mark set-reset flip-flop 29. The true output terminal of the flip-flop 29 is connected to the input of AND gate 31 along with the output of clock source 26. The output of gate 31 is connected to the input of four AND gates 32, each respectively associated with one of the counters. That is, each of the AND gates 32 has a second input respectively connected to a different one of the data output terminals 24. The outputs of the AND gates 32 are respectively connected to the data input terminal 34 of a different readout register. In response to the generation of a time mark by the time mark source 30, the gates 32 are enabled to cause the counts in the respective counters to be transferred into their associated readout registers 36. In this manner, a time mark generated by some external source can cause an exact time to be read out from the counters into the readout registers. The time information so entered into the readout registers 36 can for example be utilized by digital computer means to calculate position of a vehicle as heretofore referred to.

The outputs of AND gates 38 are respectively connected to a different one of the data input terminals 22. The data output terminals 40 of calibration registers 42 are respectively connected to the input of a different one of the AND gates 38. A computer 44 is connected to the data input terminals 46 of the calibration registers to enter appropriate correction information therein which is to be provided to the respective counters to replace the counts therein at appropriate times in order to compensate for drifting, for example, of the one mc clock source 26. The computer 44 is additionally connected through a control terminal 48 to one input of each of the AND gates 38 to indicate when a calibration operation is to take place. In order to provide a precise time base with respect to which the calibration or correction information entered into the registers 42 can be referred, the output of the state detector 28 is connected to a third input of the AND gates 38. Consequently, the computer 44 is able to enter information into the calibration registers 42, generate a calibration mark signal indicating that a calibration operation is to occur, and subsequently such an operation will occur when the state detector 28 recognizes that the microseconds counter 10 is initiating a new cycle.

It is pointed out that the block diagram of FIG. 1 represents a substantially conventional digital clock which can be utilized to very accurately maintain a running count of time. Although the calibration process is illustrated as being controlled by the computer 44, it may be more feasible in certain instances to permit calibration to be accomplished under operator control. For example, in response to calibration information provided by a computer or by some other source, an operator can enter appropriate information into the calibration registers 42 and cause a signal to be applied to conductor 48 which indicates that a calibration operation should take place. Again, in response to the occurrence of a time reference point, the information entered into the calibration registers can be transferred to the counters. If the calibration operation is to be accomplished with the aid of an operator, it may be desirable to permit the state detector associated with the minutes counter 14 to control the gates 38 so as to give the operator a full minute during which he can enter the calibrating information into the registers 42.

Conventional implementation of the digital clock of FIG. 1 would suggest the construction of a microseconds counter 10 having twenty stages, each stage including a conventional flip-flop circuit, all driven by the same one mc. clock source 26. In order to drive twenty flip-flop circuits, considerable power would be required of the source 26 and as previously noted, a portion of such driving power would be radiated despite reasonable precautions taken to avoid it. Such radiated power could severely adversely affect the performance of equipment in the proximity of the digtal clock, which may be adversely sensitive to noise of a one mc. frequency. In order to reduce the amount of power radiated at a single frequency, the microseconds counter 10 illustrated in FIG. 2 is provided. The microseconds counter of FIG. 2 includes first and second portions which will be referred to as the microcounter 50 illustrated as including the three least significant stages of the microseconds counter 10, and a macrocounter 52 including the most significant seventeen stages, i.e. stages 4–20 of the microseconds counter 10.

The microcounter 50 and macrocounter 52 of the microseconds counter 10 are interconnected by a buffer flip-flop F1. The microcounter 50 includes binary stages A1, A2, and A3. Each of these stages can comprise a conventional set-reset flip-flop interconnected such that for every four state changes of stage A1, stage A2 changes state twice and stage A3 changes state once. The one mc. clock source 26 is connected to stage A1 of the microcounter 50.

Figure 4:
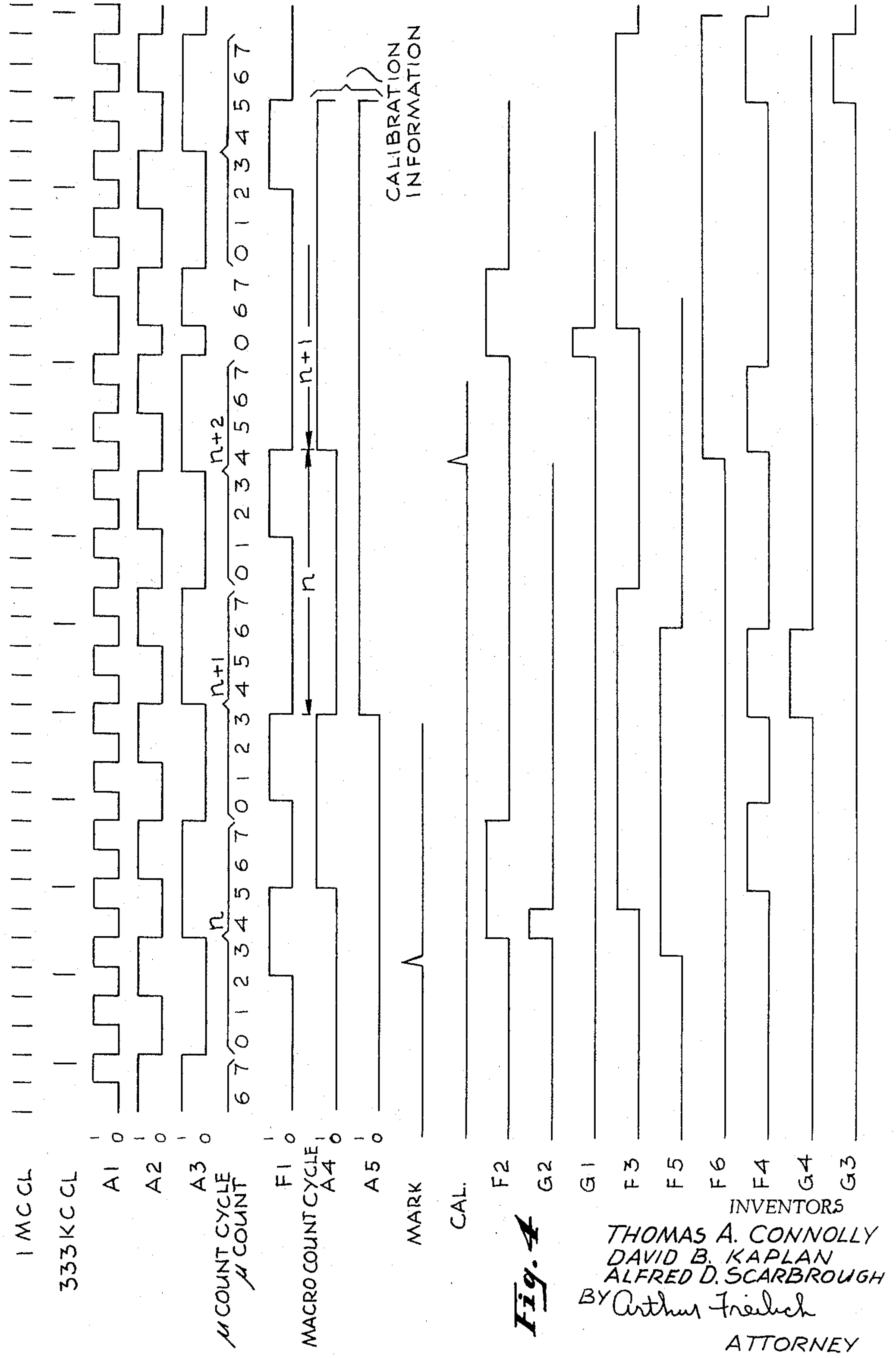
FIGURE 4 is a chart illustrating a plurality of waveforms showing the time relationships of signals utilized in the apparatus of FIGS. 2 and 3.

Now calling attention to FIG. 4, it will be noted that binary stage A1 changes state or switches in response to every pulse provided by the one mc. clock source 26. Binary stage A2 switches in response to each one mc. clock pulse occurring while stage A1 is true and binary stage A3 switches in response to each one mc. clock pulse occurring while both stages A1 and A2 are true. In this manner, it will be noted that the stages of the microcounter 50 repetitively count from binary zero to seven.

The output from binary stage A3 is connected to the input of AND gate 54 whose output is connected to the set input terminal of buffer flip-flop F1. A 333 kc. clock source 56 is also connected to the input of AND gate 54 together with the false output terminal of flip-flop F1. The output of AND gate 58 is connected to the reset input terminal of flip-flop F1 while the inputs are respectively connected to the true output terminal of flip-flop F1 and the 333 kc. clock source 56.

The output of AND gate 60 is connected to the input of stage A4 of the macrocounter 52. The inputs to AND gate 60 are connected to the true output terminal of flip-flop F1 and the 333 kc. clock source 56.

In the operation of the microseconds counter 10 of FIG. 2, flip-flop F1 is set each time a 333 kc. clock pulse occurs while stage A3 is true. In other words, flip-flop F1 is set whenever a 333 kc. clock pulse occurs during counts 0, 1, 2, or 3 of the microcounter 50. The flip-flop F1 is reset in response to each 333 kc. clock pulse which occurs when the flip-flop F1 is true.

In considering FIG. 4, it is to be noted that the one mc. clock pulses and the 333 kc. clock pulses are asynchronous. As a consequence, flip-flop F1 will switch at different relative times in the cycle of the microcounter 50. For example, note that during the microcounter cycle $n$, flip-flop F1 goes true during a microcounter of 2 while during microcount cycles $n+1$ and $n+2$ flip-flop F1 goes true during microcounts 0 and 1 respectively.

Although the time at which flip-flop F1 switches relative to the microcount cycle is not predictable, it can be noted that flip-flop F1 goes from false to true and back to false every time that stage A3 goes from false to true and back to false. Consequently, although the instantaneout output frequencies of stage A3 and flip-flop F1 are not the same, their average frequencies over an integral number of microcount cycles will be the same. It is interesting to see why this is so and to what extent the frequency of the clock source 56 can be varied while retaining this relationship.

Note that the interval between clock pulses of the 333 kc. clock source is approximately 3 microseconds. Consequently, at least one 333 kc. clock pulse must always occur during every four microsecond interval of the microcounter 50. That is, during every microcount interval represented by the microcounts 0, 1, 2, and 3, a 333 kc. clock pulse must necessarily occur to thereby cause flip-flop F1 to be set. If there were no assurance that a pulse from source 56 would be provided during that microcount interval, a microcount cycle might occur without flip-flop F1 being set. If this happened of course, then the average frequencies over an integral number of microcount cycles of stage A3 and flip-flop F1 would not be the same. Consequently, it is essential that at least one clock pulse be provided by source 56 during every 4 microseconds as defined by the microcounter 50. Consequently, the lower frequency limit on the source 56 is 250 kc. or in other words the clock pulses provided by the source 56 must be spaced by no more than 4 microseconds.

Having ascertained the lower limit for source 56, the upper limit will now be considered. Since it is desired that flip-flop F1 provide one and only one output pulse for every output pulse provided by stage A3, it is necessary to prevent flip-flop F1 from being switched on and off and on again during any half microcount cycle. That is, if the frequency of source 56 were too high, flip-flop F1 could be switched on during a microcount of 0, switched off during a microcount of 1, and switched on again during a microcount of 2. In other words, it is essential, so long as the illustrated logic is employed, that less than three pulses be provided by clock source 56 during any half microcount interval. In other words, the pulses provided by clock source 56 must be spaced by at least 1⅓ microseconds which means of course that the frequency of clock source 56 must be below 750 kc.

Therefore, it can be generalized that if 2T represents the cycle interval of the most significant stage X of the microcounter 50, then the frequency ($f_2$) of source 56 should be $1/T \leq f_2 < 3/T$. 2T bears the following relationship to the frequency ($f_1$) of source 26

$$2T = 2^x(1/f_1)$$

In words, if $f_1$ is equal to one mc., then its cycle interval is one microsecond and the cycle interval of stage X (i.e. stage $e$) is 8 μsec.

In the digital clock illustrated in FIG. 1, if the microseconds counter 10 is conventional such that all stages are driven by the same one mc. clock source 26, the count in the microseconds counter 10 can be read out in response to the occurrence of a time mark generated by source 30 and the count so read out will always be accurate to within one microsecond. However, in the microseconds counter of FIG. 2, a count cannot be as easily read out inasmuch as the time at which the macrocounter 52 is updated corresponding to a cycle of the microcounter 50 can vary by several microseconds. From FIGS. 2 and 4, it is so noted that the count in the macrocounter 52 is incremented in response to the generation of a pulse by source 56 when buffer flip-flop F1 is true. Since buffer flip-flop F1 can be set true at any time during microcounts of 0, 1, 2, or 3, the macrocounter 52 can be incremented at microcounts of 3–6 microseconds (i.e. approximately 3 microseconds after flip-flop F1 is set).

Figure 3:
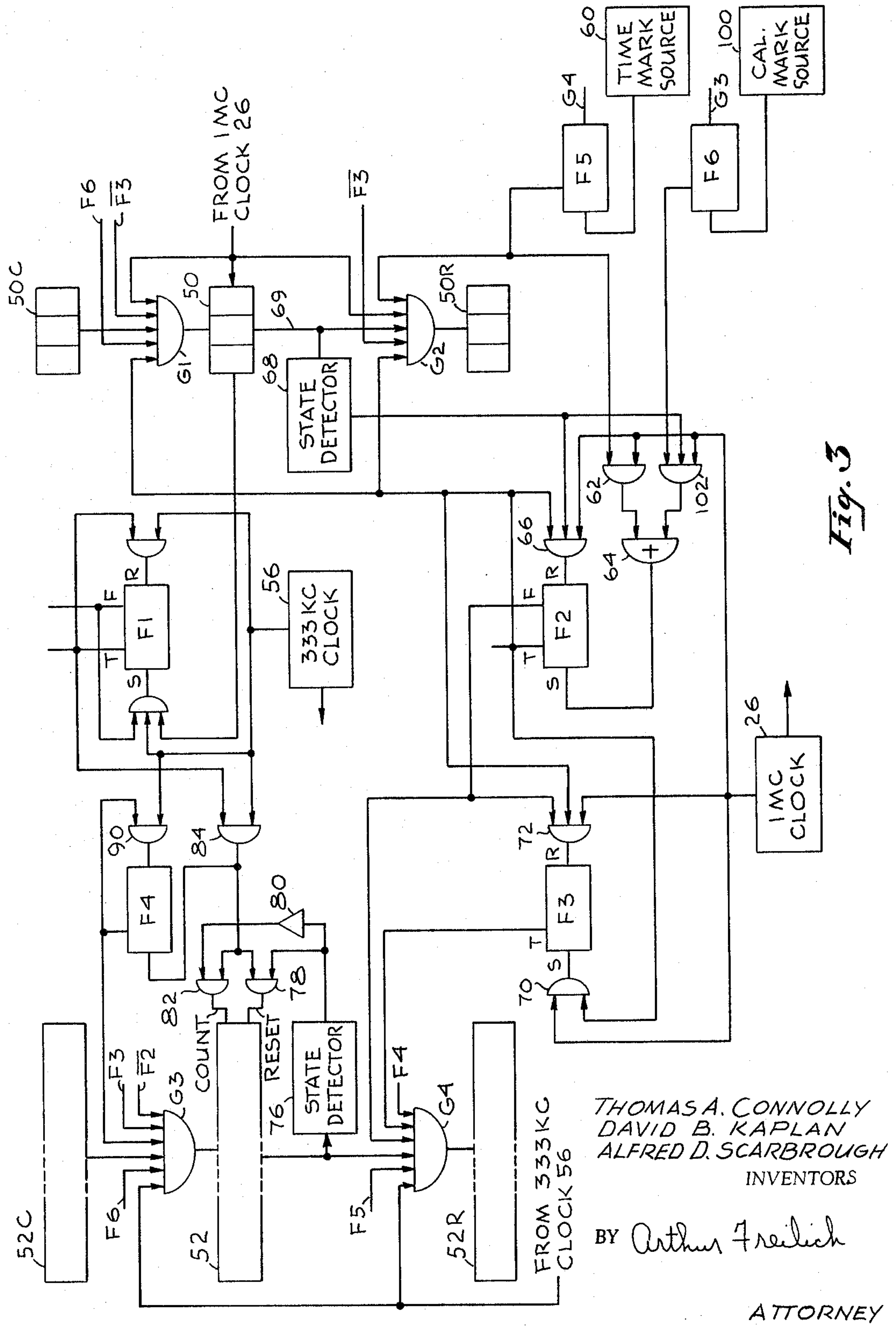
FIGURE 3 is a block diagram illustrating the counter of FIG. 2 together with additional logical circuitry for causing the counter to be read, reset, and calibrated at appropriate times.

Consequently, although the microcounter 50 can be read immediately in response to the generation of a time mark, the macrocounter 52 cannot be accurately read until the macrocounter has been updated. In other words, the macrocounter can be accurately and immediately read in response to the generation of a time mark if it has already been updated for the microcount cycle during which the time mark occurred or it could be read immediately after it was updated if the time mark occurred before updating. In order to avoid including complex, and what proves to be unnecessary, logical circuitry in order to make the decision in response to a time mark as to whether macrocount updating has or has not already occurred, the macrocount 52 can be read at some later time at which it is known that updating has already occurred. It is convenient to read the macrocounter after updating during the microcount cycle subsequent to the microcount cycle in which the time mark occurred. That is, the macrocounter 52 will be read during the macrocount cycle $n$ for time marks occurring during microcount cycle $n$. An arrangement for carrying out this readout technique is illustrated in FIG. 3. FIG. 3 again illustrates the microseconds counter of FIG. 2 and in addition includes the logical circuitry enabling the microseconds counter to be incorporated into a digital clock of a configuration as shown in FIG. 1. A microcount readout register 50R and a macrocount readout register 52R are provided to accept information transferred from the microcounter 50 and macrocounter 52 through gates G2 and G4 respectively. Additionally, a microcount calibration register 50C and a macrocount calibration register 52C are provided for transferring calibration information through gates G1 and G3 respectively into microcounter 50 and macrocounter 52.

Flip-flops F2 and F3 are provided for the purpose of effecting the appropriate time relationships between the times at which the microcount and macrocount information is handled. A time mark source 60 is connected to the set input terminal of flip-flop F5 whose true output terminal is connected to the input of AND gate 62. The output of gate 62 is connected to the input of an OR gate 64. The output of OR gate 64 is connected to the set input terminal of flip-flop F2.

The output of AND gate 66 is connected to the reset input terminal of flip-flop F2. The inputs to AND gate 66 are connected to the true output terminal of flip-flop F2 and the microcount 7 output terminal of a state detector 68 whose input is connected to the data output terminal 69 of the microcounter 50. Inputs to gates 62 and 66 are also connected to the one mc. clock source 26 (to avoid confusion, several one mc. and 333 kc. clock sources have been illustrated in FIG. 3, but it is to be understood that this duplication is for clarity purposes in the drawing only and that boxes referred to by the same designating numeral in fact comprise the same element).

The true output terminal of flip-flop F2 and the output of clock source 26 are connected to the input of AND gate 70 whose output is connected to the set input terminal of flip-flop F3. The false output terminal of flip-flop F2 together with the output of clock source 26 and the microcount 7 output terminal of state detector 68 are connected to the input of AND gate 72 whose output is connected to the reset input terminal of flip-flop F3.

The data output terminal 69 of the microcounter 50 is connected to the input of AND gate G2 along with the true output terminals of flip-flops F2 and F5, the false output terminal of flip-flop F3, and the output of clock source 26. The output of gate G2 is connected to the data input terminal of the microcount readout register 50R.

The macrocounter 52 is provided with a data output terminal 74 which is connected to the input of gate G4 along with the true output terminals of flip-flops F3, F4, and F5, the false output terminal of flip-flop F2, and the output of clock source 56. The output of gate G4 is connected to the data input terminal of macrocount readout register 52R and to the reset input terminal of flip-flop F5.

The data output terminal 74 is connected to the input of a state detector 76 whose output terminal is connected to the input of AND gate 78 whose output terminal is in turn connected to the reset input terminal of macrocounter 52. The output of state detector 76 is connected through an inverter 80 to the input of AND gate 82 whose output is connected to the count input terminal of macrocounter 52. The second inputs to gates 78 and 82 are connected to the output of gate 84 whose inputs are respectively connected to the true output terminal of flip-flop F1 and the clock source 56. The output of gate 84 is additionally connected to the set input terminal of flip-flop F4. The true output terminal of flip-flop F4 is connected to the input of AND gate 90 along with the output of the clock source 56. The output of gate 90 is connected to the reset input terminal of flip-flop F4.

The portions of FIG. 3 thus far mentioned serve to reset the microseconds counter and transfer information from the portions of the counter into the readout registers in response to the generation of a time mark by source 60. In order to facilitate an understanding of the invention, the reset and readout operations will be discussed at this point and subsequently the calibration operation and the portions of FIG. 3 utilized to accomplish it will be discussed. Let it be assumed that a time mark is generated by source 60 during microcount 3 of microcount cycle $n$ as shown in FIG. 4 of the drawings. In response to this mark, flip-flop F5 will be set. Flip-flop F2 will be set upon the occurrence of a subsequent one mc. clock pulse. Flip-flop F3 will be set one microsecond after flip-flop F2. In response to flip-flops F2 and F5 being set, and prior to flip-flop F3 being set, the output of gate G2 will go true to thereby transfer the count stored in microcounter 50 into the microcount readout register 50R. It is to be understood that in actuality a gate G2 would be necessary for each stage of the microcounter portion 50 and that the illustrated gate G2 (and similarly the gates G1, G3, and G4) are representative of one gate per stage of the respective counter portions. Consequently, it can be seen that the microcounter count will be entered into the readout register 50R in response to the initial mc. clock pulse occurring after the occurrence of the time mark.

The flip-flop F2 will be reset in response to microcount 7, i.e. the end of the microcount cycle in which the time mark occurs. The flip-flops F3 and F5 will remain set throughout the succeeding microcount cycle ($n+1$). Flip-flop F4 will be set by the generation of a 333 kc. clock pulse when flip-flop F1 is true. That is, flip-flop F4 will be set in response to the same signal which increments the macrocounter 52. Flip-flop F4 is reset upon the occurrence of the first 333 kc. clock pulse after it is set. As a result of flip-flop F4 being set, gate G4 will be enabled to transfer the updated count in the macrocounter 52 into the readout register 52R. The true output signal provided by gate G4 will reset flip-flop F5. (It is here pointed out that the flip-flops are designed in a conventional manner to avoid so-called race problems.) Flip-flop F3 wil be reset at the termination if microcount cycle $n+1$. Consequently, it can be seen that in response to the generation of a time mark by source 60, the microcounter portion 50 will be read immediately while the macrocounter 52 will be read during the microcount cycle subsequent to that during which the time mark occurred after the macrocounter portion is updated.

It has been indicated that it is desired that the microseconds counter count from 0 to 999,999. This decimal number is equal to an octal number of 3641077. If the counter is to be reset at this number, means must be provided for sensing its occurrence and for applying a signal to the reset input terminal. Since the last digit of the octal representation of decimal 999,999 is "7," the three stages of the microcounter 50 which represent this digit will reset automatically. The macrocounter 52 will not reset automatically and state detector 76 and AND gate 78 are provided to generate the reset input pulse to reset macrocounter portion 52.

The calibration operation is analogous to the readout operation just discussed but opposite thereto. That is, instead of reading out information from the microcounter 50 and macrocounter 52, information is read into these counter portions from micro and macro calibration registers 50C and 52C. The same time relationships prevail however. That is, information can be read into the microcounter 50 at a specified time but the corresponding macro information has to be read into the macrocounter 52 during the next microcount cycle.

A calibration mark source 100 is provided and is connected to the set input terminal of flip-flop F6. The true output terminal of flip-flop F6 is connected to the input of AND gate 102 whose output is connected to the input of OR gate 64. The other inputs to AND gate 102 are respectively connected to the one mc. clock source 26 and the microcount 7 output terminal of state detector 68. Gate G1 is provided for transferring information from the microcount calibration register 50C into the microcounter portion 50. The data output terminal of the microcount calibration register 50C is connected to the input of gate G1 while the output of gate G1 is connected to the data input terminal of microcounter 50. Additionally, the true output terminals of flip-flops F2 and F6, the false output terminal of flip-flop F3, and the output of the one mc. clock source 26 are connected to the input of gate G1.

Gate G3 connects the data output terminal of the macrocount calibration register 52C to the data input terminal of macrocounter 52. Additionally, the true output terminals of flip-flops F3, F4, and F6 are connected to the input of AND gate G3 along with the false output terminal of flip-flop F2. The output of gate G3 is connected to the reset input terminal of flip-flop F6.

It can be assumed that the calibration mark occurs asynchronously as shown in FIG. 4 or that it and the calibration information entered into the calibration registers 50C and 52C emanates from the computer 44 as previously discussed in conjunction with FIG. 1.

Let it be assumed that a calibration mark occurs during microcount 4 of microcount cycle $n+2$ as illustrated in FIG. 4, consequently setting flip-flop F6. Flip-flop F2 will be set at the end of microcount cycle $n+2$, i.e. in response to state detector 68 detecting microcount 7 in microcounter 50. As previously noted, the calibration information must be generated with respect to some time reference and it has been assumed that the time reference will be a count of zero in the microcounter 50. The gate G1 wil go true concurrent with the flip-flop F2 being set. Flip-flop F3 will be set in response to the generation of the initial one mc. pulse following flip-flop F2 being set.

Note from FIG. 4 that the cyclical microcount pattern is disturbed after the initial microcount of zero is generated subsequent to the occurrence of the calibration mark. It is assumed in FIG. 4 that the calibration information to be entered into the microcounter 50 is a microcount of 6. This information is entered into the microcounter 50 from the microcount calibration register 50C as a result of gate G1 being enabled as shown at the microcount of zero subsequent to the microcount cycle in which the calibration mark occurred.

Gate G3 will be enabled after flip-flop F4 is set. As in the readout situation previously discussed, the count in the macrocounter portion 52 will be incremented and then the gate G3 will cause the information in the macrocounter portion 52 to be replaced by the calibrating information transferred from the macro calibration register 52C. The flip-flop F4 remains true only for the interval between the successive generation of clock pulses by the 333 kc. source 56. The enabling of gate G3 resets flip-flop F6.

From the foregoing, it should be appreciated that a counter apparatus has been provided herein which finds particular utility in digital clocks for keeping an accurate count of time. More specifically, the counter apparatus disclosed herein is useful in any system in which it is desired to reduce the number of counter stages being driven by a generator operating at a single frequency.

The embodiments of the invention in which an exclusive property or privilege is claimed are defined as follows:

1. In a digital counter including $n$ stages,
a first frequency generator;
a second frequency generator operating asynchronously with respect to said first frequency generator;
a first counter portion including $x$ stages;
a second counter portion including $n-x$ stages;
means connecting said first frequency generator to said first counter portion for driving said $x$ stages;
means connecting said second frequency generator to said second counter portion for driving said $n-x$ stages; and
means interconnecting said first and second counter portions for causing said second counter portion to count cycles of said first counter portion.

2. Digital counter apparatus comprising:
$n$ binary devices;
a first counter portion including $x$ of said $n$ binary devices;
a second counter portion including $n-x$ of said $n$ binary devices;
a first frequency generator for providing pulses at a first frequency;
a second frequency generator for providing pulses at a second frequency;
means connecting said first frequency generator to said first counter portion for causing said first counter portion to continuously count the number of first frequency pulses provided by said first frequency generator;
a buffer device;
means for recording an indication of each cycle of said first counter portion in said buffer device at times determined by the occurrence of said frequency pulses;
means for reading said recorded indication at times determined by the occurrence of said second frequency pulses; and
means for causing said second counter portion to count the number of indications read.

3. In combination, a first binary counter;
a second binary counter;
each of said binary counters including a count input terminal and being responsive to the application of a signal to said count input terminal for incrementing the count thereof;
a first frequency generator for providing pulses at a first frequency;

means connecting said first frequency generator to said first binary counter input terminal;
a second frequency generator for providing pulses at a second frequency;
means for generating an output pulse for each cycle of said first binary counter at times determined by the occurrence of said second frequency pulses; and
means applying said generated output pulses to said second binary counter input terminal.

4. A counter including $n$ binary stages comprising:
a first counter portion including $x$ binary stages;
a first generator for providing output pulses at a first frequency;
means connecting said first generator to a first of said $x$ binary stages for causing said first of said $x$ binary stages to provide output pulses at one-half said first frequency;
means interconnecting said $x$ binary stages in tandem for causing each of said $x$ stages to provide output pulses at one-half the frequency of the preceding stage connected thereto;
a second counter portion including $n-x$ binary stages;
means interconnecting said $n-x$ binary stages in tandem for causing each of said $n-x$ stages to provide output pulses at one-half the frequency of the preceding stage connected thereto;
a binary buffer stage;
a second generator for providing output pulses at a second frequency asynchronously related to said first frequency;
means responsive to the concurrence of a second frequency output pulse and a first state of the $x$ stage of said $x$ binary stages for causing said buffer stage to assume a first state; and
means responsive to the concurrence of a second frequency output pulse and a first state of the binary buffer stage for applying an incrementing pulse to the first stage of said $n-x$ binary stages.

5. A counter including $n$ binary stages comprising:
a first counter portion including $x$ binary stages;
a first generator for providing output pulses at a first frequency ($f_1$);
means connecting said first generator to a first of said $x$ binary stages for causing said first of said $x$ binary stages to provide output pulses at one-half said first frequency;
means interconnecting said $x$ binary stages in tandem for causing each of said $x$ stages to provide output pulses at one-half the frequency of the preceding stage connected thereto whereby said $x$ stage is caused to provide output pulses spaced by an interval 2T where $2T=2^x(1/f_1)$;
a second counter portion including $n-x$ binary stages;
means interconnecting said $n-x$ binary stages in tandem for causing each of said $n-x$ stages to provide output pulses at one-half the frequency of the preceding stage connected thereto;
a binary buffer stage;
a second generator for providing output pulses at a second frequency ($f_2$) asynchronously related to said first frequency and related to the interval 2T by $1/T \leq f_2 < 3/T$;
means responsive to the concurrence of a second frequency output pulse and a first state of the $x$ stage of said $x$ binary stages for causing said buffer stage to assume a first state; and
means responsive to the concurrence of a second frequency output pulse and a first state of the binary buffer stage for applying an incrementing pulse to the first stage of said $n-x$ binary stages whereby said second counter portion effectively counts cycles of said first counter portion.

6. A counter including $n$ binary stages comprising:
a first counter portion including $x$ binary stages;
a first generator for providing output pulses at a first frequency ($f_1$);
means connecting said first generator to a first of said $x$ binary stages for causing said first of said $x$ binary stages to provide output pulses at one-half said first frequency;
means interconnecting said $x$ binary stages in tandem for causing each of said $x$ stages to provide output pulses at one-half the frequency of the preceding stage connected thereto whereby said $x$ stage is caused to provide output pulses spaced by an interval 2T where $2T=2^x(1/f_2)$;
a second counter portion including $n-x$ binary stages;
means interconnecting said $n-x$ binary stages in tandem for causing each of said $n-x$ stages to provide output pulses at one-half the frequency of the preceding stage connected thereto;
a binary buffer stage;
a second generator for providing output pulses at a second frequency ($f_2$) asynchronously related to said first frequency and related to the interval 2T by $1/T \leq f_2 < 3/T$;
means responsive to the concurrence of a second frequency output pulse and a first state of the $x$ stage of said $x$ binary stages for causing said buffer stage to assume a first state;
means responsive to the concurrence of a second frequency output pulse and a first state of the binary buffer stage for applying an incrementing pulse to the first stage of said $n-x$ binary stages whereby said second counter portion effectively counts cycles of said first counter portion;
means for generating time mark signals;
a first and a second readout register; and
means responsive to the generation of a time mark signal for causing count information in said first and second counter portions to be transferred into said first and second readout registers respectively.

7. The counter of claim 6 wherein said means responsive to the generation of a time mark signal includes first means for transferring said count information in said first counter portion into said first readout register a predetermined time after the generation of said time mark signal and second means for transferring said count information in said second counter portion into said second readout register after said incrementing pulse generated during the same first counter cycle as said time mark is applied to said first stage of said $n-x$ binary stages.

8. The counter of claim 6 wherein said means responsive to the generation of a time mark signal includes first means responsive to the generation of a predetermined number of first frequency output pulses subsequent to the generation of said time mark signal for transferring said count information from said first count portion into said first readout register and second means responsive to the generation of said incrementing pulse during a cycle of said first counter portion subsequent to the cycle in which said time mark is generated for transferring said count information in said second counter portion subsequent to the application of said incrementing pulse to the first stage thereof, into said second readout register.

9. A counter including $n$ binary stages comprising:
a first counter portion including $x$ binary stages;
a first generator for providing output pulses at a first frequency;
means connecting said first generator to a first of said $x$ binary stages for causing said first of said $x$ binary stages to provide output pulses at one-half said first frequency;
means interconnecting said $x$ binary stages in tandem for causing each of said $x$ stages to provide output pulses at one-half the frequency of the preceding stage connected thereto;
a second counter portion including $n-x$ binary stages;
means interconnecting said $n-x$ binary stages in tandem for causing each of said $n-x$ stages to provide output pulses at one-half the frequency of the preceding stage connected thereto;
a binary buffer stage;
a second generator for providing output pulses at a second frequency asynchronously related to said first frequency;
means responsive to the concurrence of a second frequency output pulse and a first state of the $x$ stage of said $x$ binary stages for causing said buffer stage to assume a first state;
means responsive to the concurrence of a second frequency output pulse and a first state of the binary buffer stage for applying an incrementing pulse to the first stage of said $n-x$ binary stages;
means for generating calibration mark signals;
a first and a second calibration register;
means for storing calibration information in said first and second calibration registers; and
means responsive to the generation of a calibration mark signal and the occurrence of a reference count defined by at least said first counter portion for causing said calibration information stored in said first and second calibration registers to be transferred into said first and second counters respectively.

10. The counter of claim 9 wherein said means responsive to the generation of a calibration mark signal and the occurrence of a reference count includes first means for transferring said calibration information in said first calibration register into said first counter portion a predetermined time after said calibration mark signal is generated and said reference count occurs and second means for transferring said calibration information in said second calibration register into said second counter portion after said incrementing pulse generated during the first counter cycle in which said calibration mark signal was generated and said reference count occurred is applied to said first stage of said $n-x$ binary stages.

11. In a digital clock including a pulse generator and a plurality of different cyclical counter sections connected in tandem, one section being adapted to count pulses generated by said generator and each other section being adapted to count cycles of a preceding section connected thereto, at least one of said sections comprising:
$n$ binary stages;
a first counter portion including $x$ of said $n$ binary stages;
a second counter portion including $n-x$ of said $n$ binary stages;
first means for providing pulses at a first frequency;
second means for providing pulses at a second frequency;
means connecting said first means to said first counter portion for causing said first counter portion to continuously count the number of first frequency pulses provided by said first means;
a buffer device;
means for recording an indication of each cycle of said first counter portion in said buffer device at times determined by the occurrence of said second frequency pulses;
means for reading said indications at times determined by the occurrence of said second frequency pulses; and
means for causing said second counter portion to count the number of indications read.

No references cited.

MAYNARD P. WILBUR, *Primary Examiner.*

J. F. MILLER, W. J. KOPACZ, *Assistant Examiners.*